United States Patent [19]

Watanabe et al.

[11] Patent Number: 4,616,445

[45] Date of Patent: Oct. 14, 1986

[54] CONSTRUCTION OF DOOR IN MOTOR VEHICLE

[75] Inventors: Hiroyuki Watanabe; Eiichi Hamada, both of Toyota; Motomu Hayashi, Okazaki; Kenji Ono, Toyota, all of Japan

[73] Assignee: Toyota Jidosha Kabushiki Kaisha, Japan

[21] Appl. No.: 635,247

[22] Filed: Jul. 27, 1984

[30] Foreign Application Priority Data

Jul. 29, 1983 [JP] Japan .................. 58-119489[U]

[51] Int. Cl.⁴ ............................................. E05F 11/38
[52] U.S. Cl. ...................................... 49/374; 49/227; 49/348
[58] Field of Search ................. 49/374, 226, 227, 360, 49/502, 348; 296/246

[56] References Cited

U.S. PATENT DOCUMENTS

| | | | |
|---|---|---|---|
| 3,162,281 | 12/1964 | Kraska et al. | 49/374 |
| 3,385,000 | 5/1968 | Sturtevant et al. | 49/374 |
| 3,566,540 | 3/1971 | Hewitt | 49/374 |
| 3,591,982 | 7/1971 | Nantau | 49/227 |
| 3,591,983 | 7/1971 | Hanson | 49/227 |
| 3,808,743 | 5/1974 | Renner et al. | 49/374 |
| 3,844,064 | 10/1974 | Yamaha et al. | 49/227 |
| 4,051,632 | 10/1977 | Fukumoto et al. | 49/227 |
| 4,219,968 | 9/1980 | Sakai et al. | 49/227 |
| 4,240,227 | 12/1980 | Hasler et al. | |
| 4,417,419 | 11/1983 | Rossie et al. | 49/348 |
| 4,454,688 | 6/1984 | Rest et al. | 49/374 |
| 4,457,109 | 7/1984 | Royse | 49/374 |
| 4,490,942 | 1/1985 | Arnheim et al. | 49/374 |
| 4,503,639 | 3/1985 | Rossie et al. | 49/227 |

FOREIGN PATENT DOCUMENTS

| | | | |
|---|---|---|---|
| 2634778 | 6/1977 | Fed. Rep. of Germany | 49/227 |
| 1190350 | 5/1970 | United Kingdom | 49/374 |

Primary Examiner—Victor N. Sakran
Attorney, Agent, or Firm—Finnegan, Henderson, Farabow, Garrett & Dunner

[57] ABSTRACT

A vehicle door comprising a door section having a door panel and a window frame, wherein the door panel includes an inner housing extending between an exterior and an interior of the vehicle. Forward and rearward guide channels are secured to the door panel and extend within the inner housing and the window section of the door. Guide members connected to a door glass ride within the forward and rearward channels and include attachment members secured to the door glass for positioning the door glass in response to movement of the guide members within the forward and rearward channels. Forward and rearward brackets are attached to the window frame and include weather seals extending between the bracket and the door glass. A housing supporting a mirror is mounted on the vehicle door and extends along the forward bracket. The housing is mounted so that the forward guide channels are positioned between the forward bracket and the mirror, in order to prevent an obstructed view of the mirror by a vehicle occupant.

8 Claims, 2 Drawing Figures

CONSTRUCTION OF DOOR IN MOTOR VEHICLE

BACKGROUND OF THE INVENTION

1. Field of the Invention

This invention relates to a construction of a door in a motor vehicle, and more particularly to a construction of a door in a motor vehicle suitable for use in a so-called flush surface type motor vehicle, wherein the outer surface of a vehicle body and the surface of a door glass are flush with each other.

2. Description of the Prior Art

The air resistance in value during running of a motor vehicle at high speed may reach more than twice the rolling resistance in value.

In view of the above, there has been proposed a so-called flush surface type motor vehicle in which the surfaces of a vehicle body including the surfaces of vehicle windows are flush with one anothr so as to reduce the air resistance.

A door in the flush surface type motor vehicle of the type described should be constructed such that the outer surface of a door glass and the outer surface of a door frame are substantially flush with each other when the window is fully closed. In this situation however the door glass is sucked outwardly due to a difference in pressure between the interior and the exterior of a compartment during running of the motor vehicle at a high speed. Further the door glass typically floats up and outwardly from the outer surface of a door, causing so-called wind breaking sounds to occur, particularly of the air resistance during running is increased.

To obviate the above-described disadvantages, as described in West Germany Patent Publication DE 2809721, West Germany Patent Laid-Open DOS 2827372 or Japanese Patent Kokai (Laid-Open) No. 5217/81 for example, there have been proposed a construction of a door in a motor vehicle, wherein sliders each having a forward end sliding portion projected into a compartment are secured to end portions of a door glass, and the sliding portion of the sliders are slidably guided by guides on a door frame in directions of opening and closing of the door glass, so that the outer surfaces of the door glass and the door frame can be substantially flush with each other.

A suitable number of the above-described sliders are secured to a forward end and a rear end of the door glass. Guide channels restrain the door glass along the thickness of the door glass. The sliders slidably guide the door glass for of opening and closing of the door glass and are secured to the forward and rear ends of the door frame, which are parallel to each other.

The above-described construction of the door in a motor vehicle can reliably guide the door glass while holding the surfaces of the door glass and the outer surface of the vehicle body flush with each other. On the other hand, this construction enables the sliders mounted to the interior of the door glass and having bolts and the like for securing the sliders to the door glass to be observed from outside of the vehicle body, thereby deteriorating the vehicle's appearance.

Further, there is presented such a disadvantage that, in the fully opened state of the door glass, glass guide channels for guiding the door glass and sliders provided at the top of the window may observed.

Recently, a door mirror has been mounted to the outer surface of a triangular portion at the forward end of a window opening of the side door. However, in this construction of the door, in which the door mirror is mounted, a guide at a forward end portion of the door glass is normally disposed rearwardly of the door mirror, causing an indirect field of vision for the driver or the seated occupant.

SUMMARY OF THE INVENTION

It is therefore the primary object of the present invention to provide a construction of a door in a motor vehicle, wherein guide means and a glass guide channel at the forward end portion of the door glass of a window are made to improve the appearance and to prevent an indirect field of vision to a door mirror by the glass guide channel.

According to the present invention a door in a motor vehicle includes guide means having a forward end sliding portion projecting into a compartment and secured to end portions of a door glass positioned within a window, and the sliding portions of said guide means are slidably guided by guide channels on a door frame in directions of opening and closing of the door glass, whereby the outer surfaces of the door glass and the door frame are substantially flush with each other, and a door mirror is mounted to a triangular portion at a forward end of a window opening, characterized in that said guide means is provided at least at a top end position in a forward portion of the door glass and a forward guide channel for guiding guide means at the top end position in the forward portion of the door glass, the forward guide channel being disposed at a position of said door mirror on the compartment's side and along the rear end edge of said door mirror, whereby the guide means and the guide channel in the forward position of the door glass are substantially concealed behind the door mirror when viewed from the side, so that the appearance is improved and the field of vision through the door mirror is not limited by the guide channel.

To the above end, the present invention contemplates that said guide means include a rear top end sliding member provided at a top end position in a rear portion of the door glass, a rear bottom end sliding member provided at a rear bottom end position in the rear portion of the door glass and a forward sliding member provided at a top end position in a forward portion of the door glass.

To the above end, the present invention contemplates that said forward guide channel is vertically extended adjacent the triangular portion provided at the forward end of the door as a wind opening to the interior of a door panel, and a portion of said guide channel extending above the door beltline is mounted behind the door mirror on the compartment's side.

To the above end, the present invention contemplates that sealing means, such as a forward door glass weather strip, is brought into contact with the forward end edge of the door glass to seal a space formed between the door frame and the forward end of the door glass, the sealing means being formed into a substantially U-shape in section so as to evenly contact the inner and outer surface of the forward end edge of the door glass.

To the above end, the present invention also contemplates that sealing means, such as a rear door glass weather strip, is brought into contact with the rear end edge of the door glass to seal a space formed between the door frame and the rear end of the door glass, the sealing means being formed into a substantially L-shape in section so as to mainly contact the inner surface of the door glass.

To the above end, the present invention contemplates that door glass pieces each being of a substantially crank shape and having a forward end offset into the compartment are secured to end portions of the door glass, and said door glass pieces are brought into sliding contact with said forward and rear door glass weather strips.

DETAILED DESCRIPTION OF THE PREFERRED EMBODIMENT

Description will be given of one embodiment of the present invention with reference to the drawings.

Figure 1:
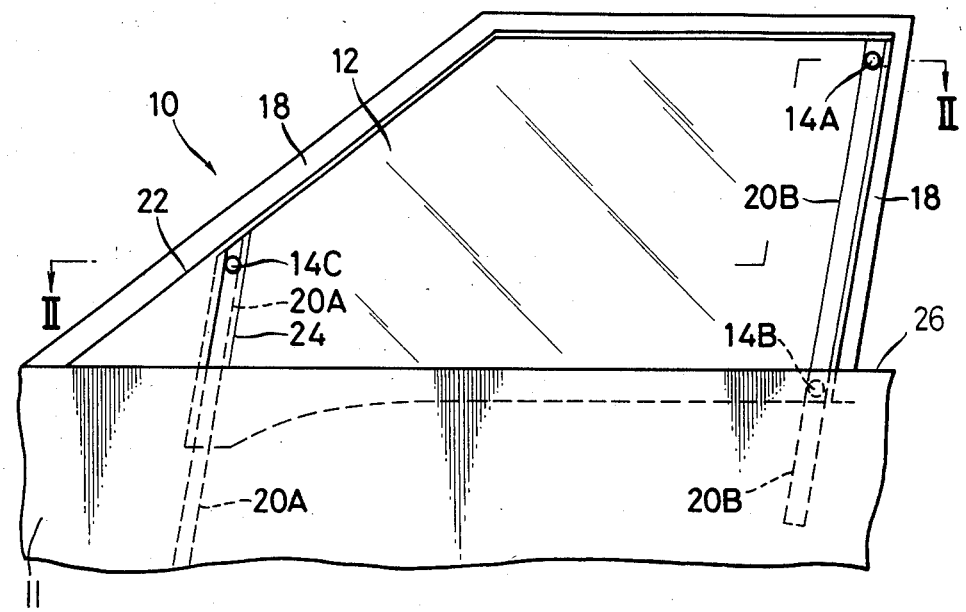
FIG. 1 is a side view showing an embodiment of the construction of a door in a motor vehicle according to the present invention.
Figure 2:
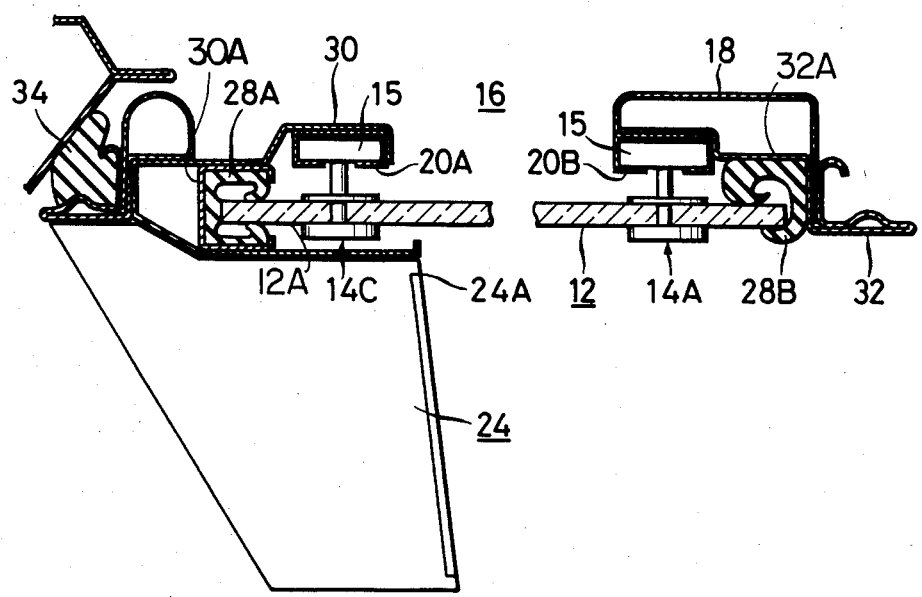
FIG. 2 is an enlarged sectional view taken along the line II—II in FIG. 1.

As shown in FIGS. 1 and 2, according to this embodiment, a construction of a window and door in a motor vehicle includes a forward end guide means having sliding member 15 projecting into a compartment 16 and secured to end portion 12A of a door glass 12 in a side door 10. The sliding members 15 slide the door glass which is mounted in guide channels on a door frame 18, thereby opening and closing of the door glass 12. The outer surfaces of the door glass 12 and the door frame 18 are substantially flush with each other. A door mirror is mounted along a triangular portion 22 positioned at a forward end of a window opening. Preferably three sliding members are provided which include a rear top end sliding members 14A provided at a top end position in a rear portion of the door glass 12, a rear bottom end sliding member 14B provided at a bottom end position in the rear portion of the door glass 12, which is positioned lower than a window line 26 when the door glass 12 is fully closed. A forward sliding member 14C or cap member is provided at a top end position in a forward portion of the door glass 12. Further, a forward guide channel 20A for guiding the sliding member 14C is provided at the top end position in the forward portion of the door glass 12. A door mirror 24 is mounted on the side of compartment 16 so that the guide channel is proximate the rear end edge 24A of the door mirror 24.

More specifically, the forward guide channel 20A is vertically extended along a side of the triangular portion 22 provided at the forward end of the door window opening. The forward guide channel 20A extends into the door panel 11 and a portion of the guide channel 20A extends above the window line 26, while being slightly forward of the rear end edge 24A of the door mirror 24 on the side of the compartment 16, so that the view of the mirrow by the seated occupant is not impaired.

In FIG. 2, designated at 20B is rear guide channel extending along the rear portion of the door frame 18 and into an inner portion of the door panel 11, for guiding the rear top end slider 14A, which is secured to the rear end of the door glass 12 and the rear bottom end slider 14B, 28A and 28B. Forward and rear door glass weather strips are in sliding contact with the forward end edge and rear end edge of the door glass 12, respectively, for sealing spaces formed between the door frame 18 and the door glass 12. A bracket frame 30 is provided for connecting the forward guide channel 20A to the door frame 18. The bracket frame 30 also connects the outer bracket surface 32 of the vehicle body, and a door weather strip 34 for sealing a space formed between the side door 10 and the vehicle body.

The forward door glass weather strip 28A is formed into a substantially U-shape and is attached to a forward bracket 30A so as to evenly contact the inner and outer surface of the forward end edge of the door glass 12.

The rear door glass weather strip 28B is formed into a substantially L-shape and is attached to a rearward bracket 32A so as to contact primarily the inner surface of the door glass 12.

According to this embodiment the sliding members secured to the door glass 12 include the forward sliding member 14C provided at the top end portion in the forward portion of the door glass 12, the rear top end sliding member 14A provided at the top end position in the rear portion of the door glass 12 and the rear bottom end sliding member 14B provided at the bottom end position in the rear portion of the door glass 12. The rear bottom end sliding member 14B is disposed at the position lower than the window line 26 in the fully closed state of the door glass 12. The forward guide channel 20A, which guides the forward sliding member 14C, is disposed at the position of the door mirror 24 on the side of the compartment 16 and along the rear end edge 24A of the door mirror 24. Therefore, the sliding member observed from outside is limited only to the rear top end slider 14A. The forward guide channel 20A is constantly concealed from view behind the door mirror 24, when viewed from the side of the vehicle so that the appearance can be improved. Further the indirect field of vision through the door mirror 24 by the occupant is prevented by the forward guide channel 20A.

Furthermore, in this embodiment, the forward door glass weather strip 28A is disposed in such a space inwardly of the door mirror 24 that, even if the door glass weather strip 28A protrudes outwardly from the outer surface of the door glass 12, it does not hinder the flush surface, whereby as the forward door glass weather strip 28A, a weather strip of a U-shape in section, being large in contact area contacting the door glass 12 is provided, differing from the case of the rear door glass weather strip 28B, so that reliable sealing can be achieved.

Additionally, the above-described embodiment is of the arrangement that the door glass weather strips 28A and 28B effect sealing by directly contacting the forward end edge and rear end edge of the door glass 12. The present invention, however, is not limited to this embodiment. For example, door glass pieces each being of a substantially crank shape in section and having a forward end offset into the compartment are secured to an end portion of the door glass 12 and the door glass pieces are brought into sliding contact with the door glass weather strips 28A and 28B.

What is claimed is:

1. A vehicle door comprising:
   a door section having a door panel and a window frame, said door panel having an inner housing extending between an exterior and an interior of said vehicle when said door section is closed, said inner housing including an opening along an upper surface of said door panel, said window frame being secured to said door section at opposite ends of said opening and defining a window section;

a forward and rearward guide channel secured to said door panel and extending within said inner portion and said window section, at least a portion of said forward and rearward guide channels being aligned in parallel;

a door glass slidably mounted within said window section, at least a portion of said door glass being housed within said inner housing;

means connecting said door glass with said pair of guide channels for slidably mounting said door glass within said window section, said connecting means including guide means for riding within said forward and rearward guide channels and having attachment means secured to said door glass for positioning said door glass in response to movement of said guide means within said forward and rearward guide channels;

bracket means attached to said window frame and including a forward bracket and a rearwad bracket, said bracket means also including sealing means affixed to said forward and said rearward brackets for providing a substantially airtight seal between said bracket means and said door glass;

a mirror housing and a mirror, said mirror being supporting on said mirror housing; and means for mounting said mirror housing on the vehicle door to extend along at least said forward bracket, wherein said mirror is positioned rearwardly of said forward bracket and said guide channel as determined relative to the length of the vehicle to prevent an obstructed view of said mirror by a vehicle occupant.

2. The vehicle door defined in claim 1, wherein said forward and rearward guide channels are aligned along said interior of the vehicle and wherein said attachment means includes a cap member mounted on said door glass and extending along said exterior of the vehicle.

3. The vehicle door defined in claim 2, wherein said window frame, said bracket means, said sealing means, and said door glass define a substantially flush contour measured relative to the length of the vehicle.

4. The vehicle door defined in claim 3, wherein said sealing means affixed to said forward bracket has a substantially U-shaped configuration for engaging opposite sides of said door glass along a forward end portion of said door glass.

5. The vehicle door defined in claim 3, wherein said sealing means affixed to said rearward bracket extends primarily along the side of said door glass facing said interior of the vehicle.

6. The vehicle door defined in claim 3, wherein the length of said forward guide channel within said window section is substantially less than the corresponding length of said rearward guide channel.

7. The vehicle door defined in claim 3, wherein said guide means includes an individual sliding member mounted within said forward guide channel, said guide means also including upper and lower sliding members mounted within said rearward guide channel, and wherein said lower sliding member is positioned within said inner housing when said door glass is fully closed.

8. The vehicle door defined in claim 3, further comprising door glass pieces having a substantially crank shape, said door glass pieces having a forward end offset into said vehicle and secured to end portions of said door glass, wherein said door glass pieces are slidably engaged with said sealing means.

* * * * *